United States Patent [19]

Hirsch et al.

[11] 4,037,806
[45] July 26, 1977

[54] CONTROL SYSTEM FOR ROLLING MISSILE WITH TARGET SEEKER HEAD

[75] Inventors: Joseph G. Hirsch, Diamond Bar; Jack L. Hoffa, Brea; Garry T. Lacy, Claremont; Jerry M. Mowell, Covina, all of Calif.

[73] Assignee: General Dynamics Corporation, Pomona, Calif.

[21] Appl. No.: 397,674

[22] Filed: Sept. 16, 1964

[51] Int. Cl.² ............................................. F42B 13/30
[52] U.S. Cl. .................................... 244/3.16; 244/3.21
[58] Field of Search ...................... 102/50; 244/14, 77, 244/77 F, 3.16, 3.15, 3.23, 3.24, 3.27, 3.28, 3.21, 3.22; 318/20.480, 20.525

[56] References Cited

U.S. PATENT DOCUMENTS

| | | | |
|---|---|---|---|
| 2,714,693 | 8/1955 | Van Eyk | 318/448 X |
| 2,925,966 | 2/1960 | Kongelbeck | 244/14 |
| 3,003,096 | 10/1961 | Du Bois | 318/29 X |
| 3,018,071 | 1/1962 | Horton et al. | 244/77 |
| 3,072,365 | 1/1963 | Linscott et al. | 244/14 |
| 3,131,340 | 4/1964 | Johnson et al. | 318/28 |
| 3,241,016 | 3/1966 | Wattson | 318/18 |

*Primary Examiner*—Verlin R. Pendegrass
*Attorney, Agent, or Firm*—Lafayette E. Carnahan; Edward B. Johnson

[57] ABSTRACT

This invention relates to a servocontrol system for a weapon such as a missile which is a shoulder-launched, infrared-homing, guided missile which provides front-line troops with effective air defense against low altitude enemy aircraft. The weapon, described herein for purposes of illustration, consists of a missile and launcher combination which can be readily transported and operated within the normal environments associated with ground forces in a combat area. To meet the size, weight, and performance requirements, the missile achieves passive homing guidance by using a space-stabilized, infrared-seeking-head control system to generate guidance signals for a single-channel, variable-incidence wing control system working in conjunction with a rolling airframe.

19 Claims, 5 Drawing Figures

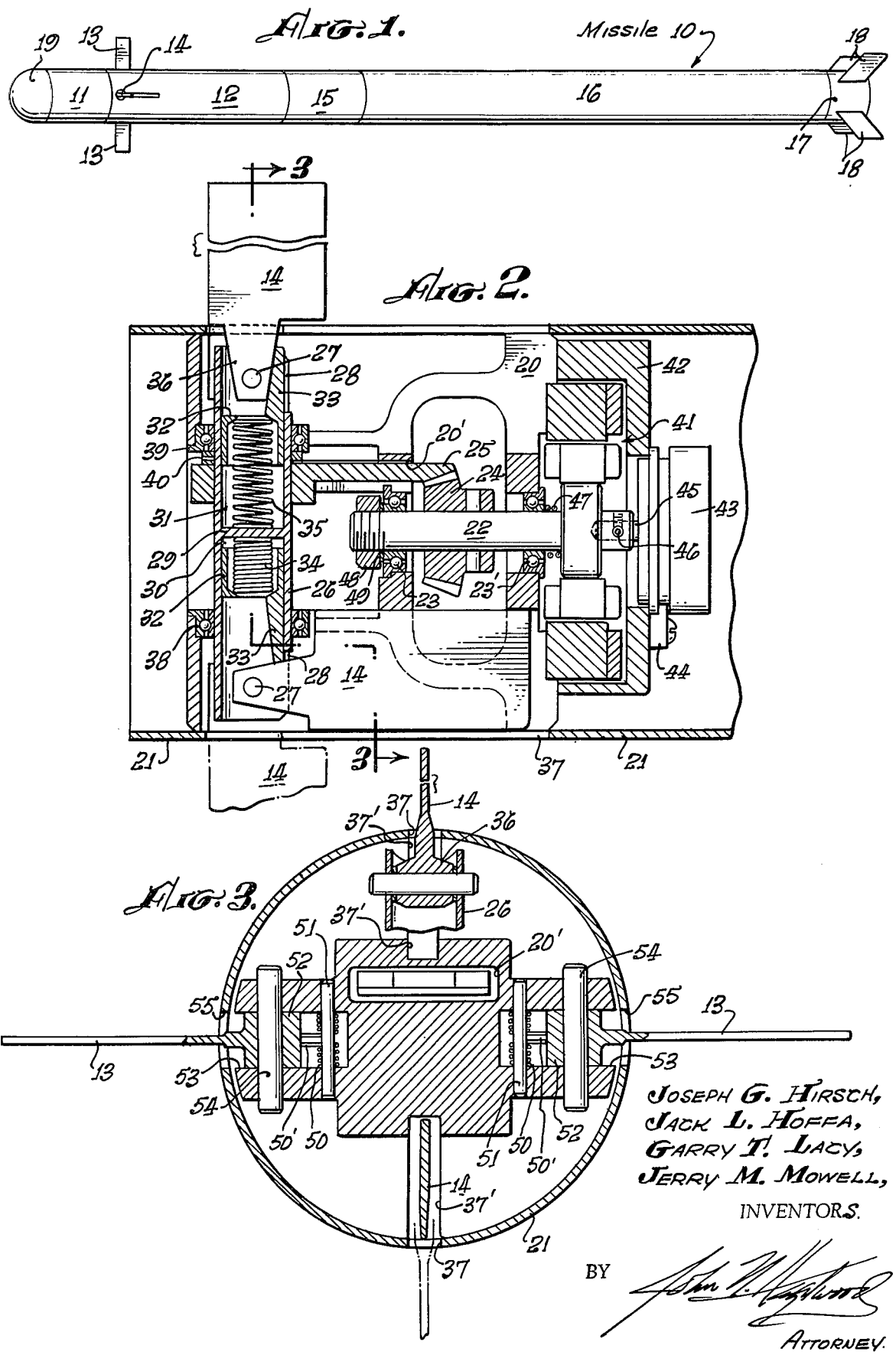

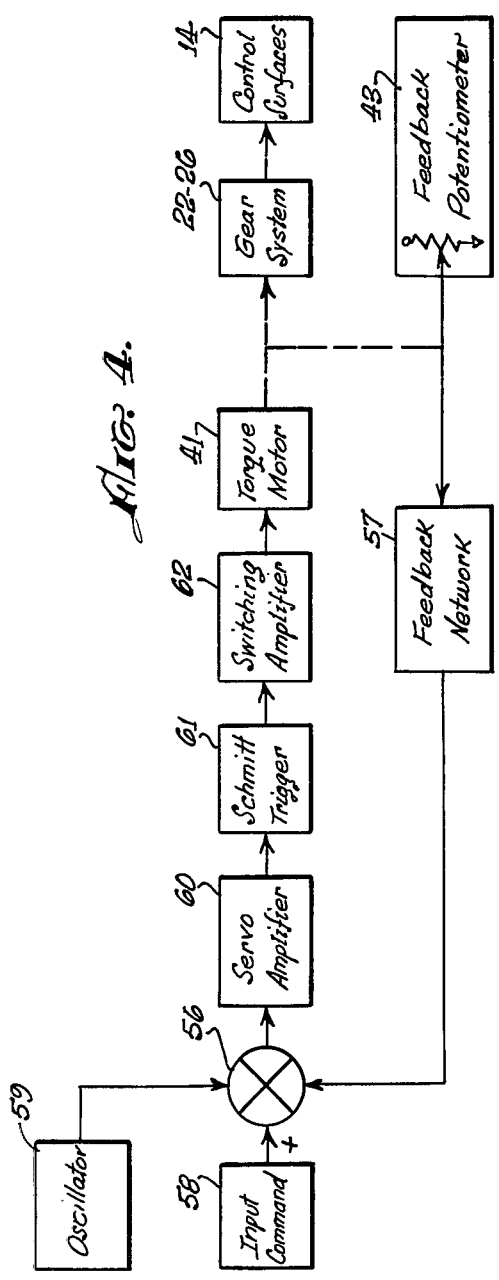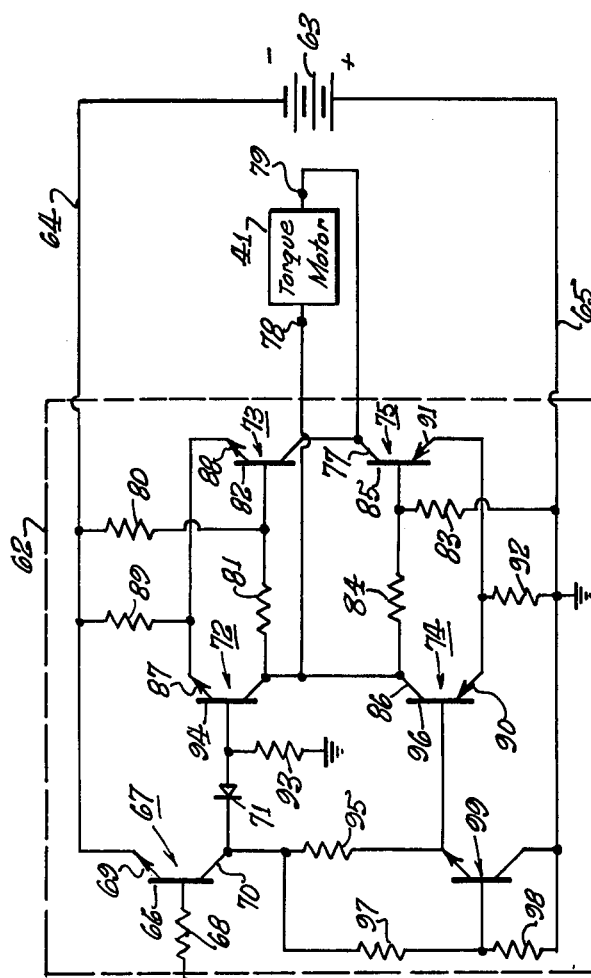

CONTROL SYSTEM FOR ROLLING MISSILE WITH TARGET SEEKER HEAD

This invention relates to control systems, particularly to missile servosystems, and more particularly to a servosystem for missiles which utilizes variable incidence aerodynamic control surfaces which are regulated as required for flight path maneuvers.

Prior to the invention set forth in the hereinafter cited copening application, control of a rolling missile was effected by utilizing fixed incidence, variable area canards or wings which were extended into the missile air stream at a certain point in the revolution of the missile, as described and claimed in U.S. Pat. No. 3,010,677.

The present invention constitutes another means for accomplishing the control of a rolling missile and is an improvement over the system described and claimed in the copening application of Herbert D. Depew et al., Ser. No. 395,112 filed Sept. 4, 1964, for "Control System", and assigned to the same assignee.

The servosystem of the present invention utilizes variable incidence wings or control surfaces as did the system disclosed in the above mentioned copending application. However, this invention provides an air vehicle such as a missile with a pair of fixed wings or canards and a pair of variable incidence control surfaces or canards which are continuously dithered or vibrated so as to provide instantaneous movement due to the elimination of the initial inertial force. Each pair of canards are extended into the missile's air stream and locked in the extended position immediately after leaving the launch mechanism.

In the servosystem of the present invention, missile wing incidence is controlled by a non-linear control servo loop and comprises a position servo having non-linear switching elements in the forward loop. The wing position output follows control-servo command input voltages, which vary sinusoidally at the missile roll frequency for steady tracking rates. The servo error signal, which is the difference between the control-servo command and the wing position feedback signals, is superimposed on a dither oscillator signal, causing the servo switching circuit to pulse modulate power to a torque motor. The torque motor integrates this incoming pulse-modulated signal so that the resultant wing deflection rate follows the servo error signal.

Therefore, an object of this invention is to provide a control system for air vehicles.

A further object of the invention is to provide a missile servocontrol system which utilizes variable incidence control surfaces.

Another object of the invention is to provide a missile servocontrol system having variable incidence control surfaces which are controlled by a non-linear control servo loop and includes a position servo having non-linear switching elements in the forwardloop.

Other objects of the invention will become readily apparent to those skilled in the art from a consideration of the following written description and accompanying drawings wherein:

FIG. 1 is an isometric view of a missile utilizing the invention;

FIG. 2 is a cross-sectional view of a portion of the control section of the FIG. 1 missile;

FIG. 3 is a cross-sectional view taken on the line 3—3 of FIG. 2;

FIG. 4 is a block diagram of the servocontrol system of the invention; and

FIG. 5 is a schematic view of a portion of the FIG. 4 servocontrol system.

The missile uses two fixed and two movable, single-plane, variable-incidence, folding control surfaces for guidance and stability and four canted tails to induce a missile roll rate as well as provide aerodynamic stability, all of which "pop-out" as the missile emerges from the launch tube. The nose of the missile is a clear hemispheric dome through which the seeker head, which utilizes a Cassegrain type optical system, for example, can sense infrared energy. The ejector motor of the motor section accelerates the missile to a desired speed and induces a desired roll rate. This motor burns out before the missile clears the launch tube. After the missile coasts a predetermined distance to prevent injury to the operator from rocket blast debris, the sustainer motor fires increasing missile velocity sufficiently for the guidance control surfaces to become effective. Acceleration of the missile completes the arming of the warhead and fuse. The canted tail fins maintain the spinning (roll) motion of the missile during flight. Throughout the flight, the seeker gyro continues to track infrared energy emitted by the target. The seeker proportional navigation signals, processed by the missile control section, command control surface movements so that the missile trajectory becomes a collision course with the target. When a maneuver is called for, the angle of the variable-incidence control surfaces is changed as required for flight path correction. The warhead of the missile is detonated by a fuse upon target intercept. A self-destruct system destroys the missile after a predetermined flight duration in the event intercept is not achieved.

Referring now to the drawings, FIG. 1 shows, for purposes of illustration, a missile 10 including an infrared-tracking seeker section 11; a guidance and control section 12 including electronic processing circuitry and two fixed and two movable, single-plane, variable-incidence folding control surfaces 13 and 14, respectively, only one movable control surface 14 being shown; a warhead/fuze section 15; a dual stage rocket motor section 16; and a tail section 17 having four folding non-variable tail surfaces 18.

The intelligence necessary for missile guidance is developed in the infrared-sensing seeker section 11, whose primary functions are to track heat radiated from the target and to provide a signal proportional to the rate of change of the angular line-of-sight to the target. Seeker intelligence is converted into airframe corrective maneuvers by the guidance and control section 12 to maintain the missile on a collision course.

While the seeker section 11 is not part of the present invention, a description of its construction and function is set forth herein to provide an understanding of the manner in which the signals to the guidance and control section 12 are generated. However, illustration of the components of the seeker section is deemed unnecessary. The seeker section 11 contains a gyro-stabilized seeker head assembly to track the target and an electronic assembly to provide an output signal proportional to the rate-of-change of the line-of-sight to the target.

Target tracking is performed by a space stabilized tracking loop consisting of a seeker optical system, signal detection circuitry, gyro precession amplifier and coils, and the gyro magnet. Tracking is initiated when infrared energy from the target passes through a seeker dome or window 19 and impinges on a primary mirror located on a gyro magnet and reflected to a secondary mirror. From the secondary mirror, the energy is reflected to a chopper reticle through a transparent sapphire secondary mirror support, and finally is received at an infrared cell after passing through a set of lenses and an optical filter. The infrared cell response, after processing, provides the gyro processional signals in the seeker to precess the seeker head toward the target.

The primary mirror, secondary mirror, and secondary mirror support (rotating at the gyro rate) are of the general configuration illustrated in the abovementioned U.S. Pat. No. 3,010,677 and form a Cassegrainian (folded) telescope, focused on the chopper reticle. The secondary mirror is tilted with respect to the gyro spin axis so that the target image is focused at a given radial distance from the reticle center. The reticle pattern is centered upon the spin axis but does not rotate with the optical elements. As a result, the focused target image on the reticle rotates around the reticle pattern at a radial distance (from the physical center of the reticle pattern) determined by the tilt angle of the optical system (secondary mirror). This technique is termed "conical" scan. If the target energy is along the spin axis of the seeker head, the circular image formed on the reticle is centered. However, if the target energy is off-boresight (off the spin axis) the image formed on the reticle moves off-center and the reticle pattern provides an amplitude modulation of the energy impinging on the infrared cell.

The amplitude modulation is at the spin frequency of the seeker head and, when demodulated in the electronics assembly, is used to provide the control signals to precess the gyro until the target image pattern on the reticle is centered (boresighted). The conical scan technique has the advantage that target information is always available (even at boresight null) and, as a result, automatic gain control is always available.

Infrared energy received at the infrared cell changes the cell impedance, resulting in an electrical signal output. This signal is amplified and processed in the seeker electronics section.

The guidance and control section 12 of missile 10 contains the target information-gathering circuitry, the intervening signal-processing circuitry, and the variable incidence wing-control circuitry described hereinafter with respect to FIGS. 4 and 5. Target information is obtained from the angular rate-of-change of the line-of-sight to the target, which is determined by the space geometry in accordance with the instantaneous headings of the missile and target (as well as accelerations and velocity). Under track conditions, the infrared energy from the target striking the infrared cell is processed to provide precessional signals to the gyro to maintain the gyro axis pointing at the target. The precessional current, which is proportional to the gyro precession rate, and therefore the rate-of-change of the line-of-sight to the target, provides a voltage input to the control section electronics. The guidance and control section 12 processes this input to provide an A.C. input to the wing servo motor to deflect the missile wing surfaces 14. Deflection of these surfaces is phased to execute the maneuver in the proper portion of the roll cycle. This phasing is necessary since the missile 10 employs a single pair of variable-incidence wing surfaces 14 to provide two-dimensional control of the missile flight path. Deflection of the wing surfaces imparts a turning maneuver in accordance with the missile aerodynamics, with a resultant change in the missile heading (velocity vector).

A proportional navigation system is used in the missile because of the stringent requirements placed upon guidance. Proportional navigation requires that the missile maneuver be proportional to the rotational rate of the missile-to-target line-of-sight. When this condition is achieved, no gyro precessional signal is present at the output of the seeker, i.e., zero rotational rate of line-of-sight (assuming a constant velocity target and missile). At this time a collision course has been attained.

Electrical energy is supplied to the missile 10 in flight by a thermal battery (not shown) which is mounted at the rear of the guidance and control section 12. In this type of battery the electrolyte is a salt which is a solid at normal temperature. To activate the battery the salt is melted by a squib-activated thermite charge. When activated, this battery provides the missile with electrical power in a fraction of a second, at very low sacrifice in space and weight.

The warhead/fuze section 15 comprises a warhead which contains the explosive charge, and a fuze, located behind the explosive charge, which contains devices which ignite the sustainer motor of section 16 and detonate the explosive charge. The missile is not armed and cannot be detonated until it has flown a safe distance from the operator. Arming of the warhead is performed by the fuze, after an exact sequence of events has occurred, which sequence is not essential for this explanation. A self-destruct feature, based on time from launch, is also incorporated into the fuze.

Missile propulsion power is provided by a dual-thrust rocket motor within motor section 16 which includes an ejector motor which propels the missile from the launcher and a sustainer motor which provides thrust for the remainder of the mission. Rocket motor section 16 consists of three distinct and separate phases: (1) high-thrust, short-duration eject phase to accelerate and spin the missile in the launch tube; (2) an interval of no power to permit the missile to clear operating personnel; and (3) a sustain phase which provides thrust to accelerate the missile in flight.

The tail section or assembly 17 has the dual function of providing airframe stabilization and inducing missile counter-clockwise roll motion. The tail section 17 includes four tail fins 18 positioned at 90° intervals on the periphery of the missile surface. These fins 18 are placed in relation to the control surfaces 13 and 14 such that the angle between a control surface and a fin is 45°, i.e., the fins are interdigitated with the control surfaces, providing greater stability.

Prior to launch, the fins 18 are folded within the launch tube. In this position, the fins are canted at an angle with respect to the missile centerline which provides the initial roll torque during launch. As the missile leaves the launcher tube, the fins 18 erect automatically, by known mechanism not part of this invention, so that the parallel sides (leading and trailing edges) of the fins form a desired angle with the missile longitudinal axis. The fins are canted at a desired angle with the missile axis which maintains the counter-clockwise roll torque on the missile in flight.

A tube type launcher (not shown) may be provided for firing the missile 10. The launcher may be provided with the added capability for aiming and inserting lead and super elevation to the missile before firing. The launcher may also serve as a carrying case in the field, thereby protecting the missile from the adverse environmental effects encountered during field handling of the weapon.

Referring now to FIGS. 2 and 3, the actuating mechanism for the fixed control surfaces 13 and the variable-incidence control surfaces 14 of the guidance and control section 12 comprises a support housing 20 positioned within skin 21 of missile 10 and held therein by any conventional means (not shown) for supporting a shaft 22 through ball type bearings 23 and 23'. A pinion gear 24 is attached to shaft 22 by any conventional means such as splines or a pin and is drivingly connected to a gear segment drive member 25 which extend through an aperture 20' in housing 20 and is in turn operatively connected to a hollow shaft 26 to which variable-incidence control surfaces 14 are pivotally mounted at 27. Shaft 26 isprovided with a slot 28 at each end thereof (see FIG. 2) to allow surfaces 14 to be folded within missile skin 21 and held therein by the wall of the launcher (not shown). Hollow shaft 26 is provided with a separator or bottoming plate 29, thereby defining a pair of chambers or cylinders 30 and 31. An abutment shoe 32 is slidably positioned within each of cylinders 30 and 31, shoes 32 being hollow at one end thereof and being provided with a wedge like portion 33 at the opposite end. Springs 34 and 35 are positioned within cylinders 30 and 31 behind shoes 32 and abut against separator plate 29, thereby tending to force the wedges 33 against stud portions 36 of control surfaces 14 for moving said surfaces outwardly through slots 37 and 37' in missile skin 21 and housing 20 to the flight or extended position upon launch of the missile 10. Hollow shaft 26 is rotatably mounted in support housing 20 through a pair of bearings 38 and 39. A spacer 40 is positioned between drive member 25 and bearing 39.

A torque motor 41 is operatively mounted on shaft 22 by conventional means not shown for rotating shaft 22 as dictated by the electronic portion of guidance and control section 12 shown in FIG. 4. A cap or bracket 42 is attached to housing 20 by means such as bolts (not shown), bracket 42 providing a support for a potentiometer 43 which is mounted thereon by retainer clamps 44 (only one shown), potentiometer 43 being operatively connected with shaft 22 through a small shaft 45 held by set screw 46. Bracket 42 additionally functions as the support for the electronics portion (not shown) of section 12.

A spring 47 is positioned around shaft 22 between the torque motor 41 and bearing 23'. The end of shaft opposite potentiometer 43 is provided with a threaded nut 48 and spacer 49, whereby adjustment of nut 48 spring loads the bearing 23 and 23' due to spring 47.

Fixed incidence wings or aerodynamic canard-like surfaces 13 are folded into the missile skin 21 as are control surfaces 14 and are extended or "popped-out" into the fight position when the missile 10 leaves the launch tube (not shown) by spring arrangements 50 (see FIG. 3) which are wound around pins 51 mounted in housing 20 and provided with a protruding end 50' which abuts against wing stubs 52 of wings 13. While not shown, locking means are provided to hold wings 13 in the extended position and may be of the wedge configuration similar to locking wedges 33 for control surfaces 14 or of the type shown in the above mentioned copending U.S. application. Fixed wings or aerodynamic surfaces 13 provide a destabilizing moment which minimizes losses in missile angle of attack and also provide an additional amount of lift which contributes to missile maneuverability.

As shown in FIG. 3, support housing 20 is provided with a pair of slots 37' for control surfaces 14 and a pair of slots 53 for the fixed wings or canards 13. In the folded position prior to launch, control surfaces 14 are pivoted at 27 to lie within slot 37' against the pressure exerted by springs 34 and 35 as shown in the lower portion of FIGS. 2 and 3; while wings 13 pivot around pins 54 and lie within slots 53 against the pressure exerted by springs 50 due to missile 10 being positioned in a launch tube which restrains any outward or extended movement of surfaces 13 and 14.

As missile 10 is fired from the launcher, springs 34 and 35 move abutment shoes 32 outwardly, whereby the wedge portions 33 abutting against control surfaces 14 move the control surfaces to the extended position. Due to the taper of wedges 33 and the configuration of stud portions 36 of the control surfaces, wedge 33 moves alongside the studs 36 when surfaces 14 are fully extended, thereby providing a positive lock for surfaces 14 which prevents the forces exerted by the airstream from folding the control surfaces in a rearwardly direction. At the same time springs 50 force wings 13 outwardly through slots 53 and slots 55 in skin 21 into their extended or flight position and are locked therein by means (not shown). When a flight error signal is generated by the seeker section 11 and transmitted through the electronics of the missile and transformed to an actuating signal for torque motor 41, shaft 22 is rotated in the direction of flight control determined by motor 41 which in turn causes rotation of pinion gear 24, gear segment member 25 and shaft 26 which causes the incidence of control surfaces 14 to be changed to a flight correction position. Due to an oscillator, described presently, in the electronic portion of the guidance and control section 12 which causes continuous motion or dithering of the control surfaces 14, the motor 41 is sensitive to very small signals from the seeker section 11 since the dithering action overcomes the inertial effects of moving control surfaces 14.

As shown in FIG. 4, the servo-control system comprises a summing point 56 which sums the servo feedback signal from a feedback network 57, the control-servo command or input command signal indicated at 58, and the dither signal from oscillator 59 which ensures that the servo loop oscillation is maintained at a certain frequency, such as approximately 250 cps, rather than some random and perhaps deleterious frequency. The signal from oscillator 59, a conventional phase shift oscillator, causes variable incidence wings 14 to dither and to continue dithering so that there is little or no mechanical inertia to overcome. When the servo feedback signal from feedback potentiometer 43 and feedback network 57 is different from the input command signal 58, an error signal is developed at summing point 56. A conventional servo amplifier 60 amplifies the error signal sufficiently to enable activation of a trigger circuit such as Schmitt trigger 61. A pulse width modulated square wave is developed by Schmitt trigger 61 and is applied to switching amplifier 62, which in turn drives the motor 41.

Referring now to FIG. 5, there is shown a schematic diagram of the switching amplifier 62 powered by a battery 63 of suitable voltage applied between leads 64 and 65. Schmitt trigger 61 is connected to the base 66 of an NPN transistor 67 through a biasing resistor 68 which determines the base current for transistor 67 when saturated. The emitter 69 of transistor 67 is directly connected to lead 64. The collector 70 of transistor 67 is connected through a rectifier or blocking diode 71 to a bridge network comprising NPN transistors 72 and 73 and PNP transistors 74 and 75. Transistor 67 operates as an input stage to the bridge network. The collectors 76, 77 of transistors 72, 75 are connected to torque motor 41 at terminals 78 and 79, respectively. Biasing resistors 80, 81 for transistor 73 are jointly connected to the base 82 of transistor 73, with the other end of resistor 80 terminating at lead 64 and the other end of resistor 81 terminating at collector 76 of transistor 72. Similarly, biasing resistors 83, 84 for transistor 75, are jointly connected to the base 85 of transistor 75, with the other end of resistor 83 terminating at lead 65 and the other end of resistor 84 terminating at collector 86 of transistor 74. The emitters 87, 88 of transistors 72, 73 are jointly connected to a biasing resistor 89 which terminates at lead 64. Similarly, the emitters 90, 91 of transistors 74, 75 are jointly connected to a biasing resistor 92 which terminates at lead 65 and ground. A biasing resistor 93 connected between the base 94 of transistor 72 and ground determines the base current for transistor 72. Another biasing resistor 95 connected between collector 70 of transistor 67 and the base 96 of transistor 74 determines the base current for transistor 74. A clamping network comprised of biasing resistors 97, 98 and an NPN transistor 99 is included to prevent transistor 74 from being activated or turned on unintentionally due to the presence of leakage current which may develop at high operating temperatures.

In operation, switching amplifier 62 is driven by Schmitt trigger 61. During the half cycle of dither signal, when the output stage of Schmitt trigger 61 is in the cut off state, transistor 67 will be cut off, thus causing transistors 73, 74 to be cut off and transistors 72, 75 to be saturated, i.e., in a highly conductive state. With transistor 67 cut off, diode 71 is reverse biased and blocks the base voltage of transistor 72, thus allowing transistor 74 to be cut off. Additionally, clamping network transistor 99 clamps the base 96 of transistor 74 to ground during this half cycle and prevents inadvertent activation of transistor 74 due to leakage current. The above described condition causes current to flow from terminal 79 to terminal 78 through torque motor 41, resulting in rotation of shaft 22. During the other half cycle of dither signal, when the output stage of Schmitt trigger 61 is saturated, transistor 67 is also saturated. With transistor 67 now turned on, diode 71 conducts and develops a voltage for base 94 of transistor 72 which is more negative than that of emitter 87, thus causing transistors 72, 75 to be cut off. At the same time, transistor 99 is turned off, removing its clamping effect, and transistors 73, 74 become saturated. The condition just described causes current to flow from terminal 78 to terminal 79 through torque motor 41, resulting in rotation of shaft 22 in the opposite direction.

It can thus be seen that the servo error signal (the difference between the control-servo command and the wing feedback signals), superimposed on the oscillator signal, causes the servo switching circuit to pulse width modulate the power to torque motor 41. Motor 41 integrates the pulse width modulated square wave so that the resultant wing deflection rate follows the servo error signal.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What we claim is:

1. A control system adapted to effect flight control of a rolling missile, said control system comprising a target seeker head mounted to the body of said missile and having means for generating electrical signals in accordance with the relative positions of the missile and an associated target, a plurality of fixed area lift producing variable incidence control surfaces extendable upon launch from within the missile body into the missile's airstream and adapted to dither in the extended position for eliminating the inertial force caused by initial movement thereof, actuator means for extending said control surfaces from within said missile body and locking same in the extended position, means engaged with said control surfaces and operable to vary the incidence of said control surfaces when actuated by electrical control signals, said actuator means including electrical means for continuously dithering said control surfaces, electronic means connected to said seeker head and said actuator means to receive the electrical signals from said seeker head and transform them into actuator control signals, said electronic means being operably connected with said dithering means, whereby the incidence angle of the control surfaces is selectively varied during that portion of the missile's roll necessary to keep the missile on a target intercept course while continuously dithering said control surfaces.

2. The control system defined in claim 1, wherein said actuator means includes a torque motor adapted to drive said control surfaces.

3. A control system adapted to effect flight control of a rolling missile, said control system comprising a target seeker head having means for generating electrical signals in accordance with the relative positions of the missile and target, a plurality of lift producing variable incidence control surfaces extendable into the missile's airstream and adapted to dither in the extended position, actuator means engaged with said control surfaces and operable to vary the incidence of said control surfaces when actuated by electrical control signals, said actuator means including means for dithering said control surfaces, electronic means connected to said seeker head and said actuator means to receive the electrical signals from said seeker head and transform them into actuator control signals, whereby the incidence angle of the control surfaces is selectively varied during that portion of the missile's roll necessary to keep the missile on a target intercept course, said dithering means including oscillator means, and said electronic means including a summing point having said oscillator means, input signal source means and feedback circuit means connected thereto, amplifier means for amplifying signals received from said summing point, trigger circuit means connected to the output of said amplifier means, and switching means responsive to said trigger circuit means for driving said actuator means.

4. The control system defined in claim 3, wherein said switching means includes an input stage connected to the output of said trigger circuit means, rectifier means responsive to alternate on-off states of said trigger circuit means, and bridge circuit means adapted for driving said actuator means.

5. A control system adapted to effect flight control of a rolling missile, said control system comprising a target seeker having means for generating electrical signals in accordance with the relative positions of the missile and target, a plurality of fixed aerodynamic surfaces extendable into the missile's airstream, a plurality of fixed area lift producing variable incidence control surface extendable into the missile's airstream and adapted to dither in the extended position whereby initial inertial forces caused by the movement thereof is eliminating, means for extending said control surfaces from within the missile and locking same in the extended position, actuator means engaged with said variable incidence control surfaces and operable to vary the incidence of said control surfaces when actuated by electrical control signals, said actuator means including electrical means for continuously dithering said variable incidence control surfaces, electronic means connected to said seeker head and said actuator means to receive the electrical signals from said seeker head and transform them into actuator control signals, said electronic means being operably connected with said dithering means whereby the incidence angle of the variable incidence control surfaces is selectively varied during that portion of the missile's roll necessary to keep the missile on a target intercept course while continuously dithering said control surfaces course.

6. The control system defined in claim 5, wherein said actuator means includes a torque motor adapted to drive said variable incidence control surfaces.

7. A control system adapted to effect flight control of a rolling missile, said control system comprising a target seeker having means for generating electrical signals in accordance with the relative positions of the missile and target, a plurality of fixed aerodynamic surfaces extendable into the missile's airstream, a plurality of lift producing variable incidence control surfaces extendable into the missile's airstream and adapted to dither in the extended position, actuator means engaged with said variable incidence control surfaces and operable to vary the incidence of said control surfaces when actuated by electrical control signals, said actuator means including means for dithering said variable incidence control surfaces, electronic means connected to said seeker head and said actuator means to receive the electrical signals from said seeker head and transform them into actuator control signals, whereby the incidence angle of the variable incidence control surfaces is selectively varied during that portion of the missile's roll necessary to keep the missile on a target intercept course, said dithering means including oscillator means, and said electronic means including a summing point having said oscillator means, input signal source means and feedback circuit means connected thereto, amplifier means for amplifying signals received from said summing point, trigger circuit means connected to the output of said amplifier means, and switching means responsive to said trigger circuit means for driving said actuator means.

8. In a rolling missile non-linear flight control system having a target seeker head and electronic means for producing control signals in response to seeker head information, a plurality of fixed area variable incidence lift producing control surfaces extendable upon launch from within said missile into a missile's airstream and adapted to dither in the extended position, means for extending said control surfaces from within said missile and locking same in the extended position, a control signal responsive actuator engaged with said control surfaces and operable to vary the incidence of said surfaces, said actuator including electrical means for continuously dithering said control surfaces, whereby the incidence of said surfaces is continuously dithered and varied during that portion of a missile's roll necessary to keep the missile on a target intercept course.

9. The rolling missile flight control system defined in claim 8, wherein said control signal responsive actuator comprises a torque motor adapted to drive said control surfaces.

10. In a rolling missile flight control system having a target seeker head and electronic means for producing control signals in response to seeker head information, a plurality of variable incidence lift producing control surfaces extendable into a missile's airstream and adapted to dither in the extended position, a control signal responsive actuator engaged with said control surfaces and operable to vary the incidence of said surfaces, said actuator including means for dithering said control surfaces, whereby the incidence of said surfaces is varied during that portion of a missile's roll necessary to keep the missile on a target intercept course, said dithering means including oscillator means, and said electronic means including a summing point having said oscillator means, input signal source means and feedback circuit means connected thereto, amplifier means for amplifying signals received from said summing point, trigger circuit means connected to the output of said amplifier means, and switching means responsive to said trigger circuit means for driving said actuator.

11. The rolling missile flight control system defined in claim 10, wherein said switching means includes an input stage connected to the output of said trigger circuit means, rectifier means responsive to alternate on-off states of said trigger circuit means, and bridge circuit means adapted for driving said actuator.

12. The rolling missile flight control system defined in claim 11, wherein said switching means additionally includes clamping circuit means for controlling unintentional activation of said switching means.

13. The rolling missile flight control system defined in claim 11, wherein said bridge circuit means includes a first pair of saturable transistors adapted for driving a shaft of said actuator in one direction, and a second pair of alternately saturable transistors adapted for driving said shaft of said actuator in the opposite direction.

14. In a rolling missile flight control system having a seeker head and electronic means for producing electrical control signals in response to seeker head information, a plurality of fixed area variable incidence lift producing control wings extendable into a missile's airstream and adapted to dither in the extended position, means for extending said control wings from within said missile into the airstream, means for locking said control wings in the extended position, and an electronic control signal responsive actuator engaged with said control wings and operable to vary the incidence of said wings when actuated by said electrical control signals, said actuator including electrical means for continuously dithering said control wings, said dithering means being operably connected to said electronic means.

15. In a rolling missile non-linear flight control system having a target seeker head and electronic means for producing control signals in response to seeker head information, a plurality of fixed aerodynamic surfaces extendable into a missile's airstream, means for extending said fixed aerodynamic surfaces from within said missile and locking same in the extended position, a plurality of fixed area variable incidence lift producing control surfaces extendable into a missile's airstream and adapted to dither in the extended position, means for extending said control surfaces from within said missile and locking same in the extended position, a control signal responsive actuator engaged with said variable incidence control surfaces and operable to vary the incidence of said control surfaces, said actuator including electrical means for continuously dithering said control surfaces, whereby the incidence of said control surfaces is varied during that portion of a missile's roll necessary to keep the missile on a target intercept course while continuously dithering said control surfaces.

16. A control system adapted to effect flight control of a rolling missile, said control system comprising an infrared sensitive target seeker head having means for generating electrical signals in accordance with the relative positions of the missile and an associated target, a plurality of fixed aerodynamic surfaces extendable into the missile's airstream, means for extending said fixed aerodynamic surfaces from within said missiles, means for locking said fixed aerodynamic surfaces in the extended position, a plurality of fixed area of variable incidence lift producing control wings extendable into the missile's airstream, means for extending said control wings from within said missile, means for locking said control wings in the extended position, means for continuously dithering said control wings in the extended position, a control signal responsive actuator engaged with said control wings and operable to vary the incidence of said wings when actuated by electrical control signals, and electronic means connected to said seeker head and said actuator to receive electrical signals from the seeker head and transform them into wing actuator control signals, said electronic means having operably connected with said dithering means, whereby the incidence of said control wings is varied during that portion of the missile's roll necessary to keep the missile on a target intercept course while continuously dithering said control wings.

17. A non-linear control circuit which includes a voltage source; a summing point; oscillator means, input signal source means, and feedback circuit means connected to said summing point; amplifier means for amplifying signals received from said summing point; trigger circuit means connected to the output of said amplifier means; and switching means responsive to said trigger circuit means for providing control signals at the output of said control circuit, said switching means including an input stage connected to the output of said trigger circuit means, rectifier means responsive to alternate on-off states of said trigger circuit means, and bridge circuit means adapted for providing said control signals.

18. The control circuit defined in claim 17, wherein said switching means additionally includes clamping network means for controlling unintentional activation of said switching means.

19. The control circuit defined in claim 17, wherein said bridge circuit means includes a first pair of saturable transistors adapted for providing a current flow in one direction, and a second pair of alternately saturable transistors adapted for providing a current flow in the opposite direction.

* * * * *